(12) United States Patent
Khalid

(10) Patent No.: US 9,038,894 B2
(45) Date of Patent: May 26, 2015

(54) PAYMENT OR OTHER TRANSACTION THROUGH MOBILE DEVICE USING NFC TO ACCESS A CONTACTLESS TRANSACTION CARD

(71) Applicant: Cellco Partnership D/B/A Verizon Wireless, Basking Ridge, NJ (US)

(72) Inventor: Mohammad Raheel Khalid, Budd Lake, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 13 days.

(21) Appl. No.: 13/682,496

(22) Filed: Nov. 20, 2012

(65) Prior Publication Data

US 2014/0138435 A1    May 22, 2014

(51) Int. Cl.
*G06K 5/00* (2006.01)
*G06Q 20/32* (2012.01)
*G06Q 20/22* (2012.01)
*G06Q 20/34* (2012.01)

(52) U.S. Cl.
CPC .......... *G06Q 20/3278* (2013.01); *G06Q 20/227* (2013.01); *G06Q 20/352* (2013.01)

(58) Field of Classification Search
CPC ............ H04W 4/0008; H04M 1/7253; H04M 2250/04; G06K 19/0723; G07F 7/0886; G06Q 20/32; G06Q 20/3278; G06Q 20/341; G06Q 20/327; G06Q 20/382
USPC ....................... 235/380; 705/26, 41; 717/178; 455/41.1, 41.2
See application file for complete search history.

(56) References Cited

U.S. PATENT DOCUMENTS

| | | | |
|---|---|---|---|
| 2007/0278291 A1* | 12/2007 | Rans et al. | 235/380 |
| 2008/0121687 A1* | 5/2008 | Buhot | 235/375 |
| 2010/0063893 A1* | 3/2010 | Townsend | 705/26 |
| 2011/0185354 A1* | 7/2011 | Tanner et al. | 717/178 |
| 2012/0011070 A1* | 1/2012 | Ward et al. | 705/72 |
| 2012/0238207 A1* | 9/2012 | Marcovecchio et al. | 455/41.1 |
| 2012/0238209 A1* | 9/2012 | Walker et al. | 455/41.2 |
| 2013/0030997 A1* | 1/2013 | Spodak et al. | 705/41 |

OTHER PUBLICATIONS

EMV Integrated Circuit Card Specifications for Payment Systems, Book 1 "Application Independent ICC to Terminal Interface Requirements", Version 4.3 Nov. 2011.
EMV Integrated Circuit Card Specifications for Payment Systems, Book 2 "Security and Key Management", Version 4.3 Nov. 2011.

(Continued)

Primary Examiner — Thien M Le
Assistant Examiner — Asifa Habib

(57) ABSTRACT

A mobile device utilizes an embedded near field communication (NFC) capability to interact with a contactless transaction card to automatically obtain information from the card, e.g. reducing or eliminating the burden of manual user entry of the account information or the like into the mobile device. The mobile device, for a financial account transaction example, may read the information from the card at the time of a transaction, e.g. to facilitate an on-line purchase, an in-store purchase, ATM transaction or the like. The mobile device may store the information from one or more contactless transaction cards, for use in future transactions of various types. The mobile device and/or a server in communication with the mobile device may track various user activities on the mobile device that also utilize information obtained from the contactless transaction card.

21 Claims, 5 Drawing Sheets

(56) References Cited

OTHER PUBLICATIONS

EMV Integrated Circuit Card Specifications for Payment Systems, Book 3 "Application Specification", Version 4.3 Nov. 2011.

EMV Integrated Circuit Card Specifications for Payment Systems, Book 4 "Cardholder, Attendent and Acquirer Interface Requirements", Version 4.3 Nov. 2011.

Contactless smartcard—Wikipedia, the free encyclopedia, http://en.wikipedia.org/wiki/Contactless_smart_card, pp. 1-7, Nov. 8, 2012.

EMV—Wikipedia, the free encyclopedia, http://en.wikipedia.org/wiki/EMV pp. 1-12, Nov. 8, 2012.

ISO/IEC 14443—Wikipedia, the free encyclopedia, http://en.wikipedia.org/wiki/ISA/IEC_14443, Nov. 8, 2012.

\* cited by examiner

PAYMENT OR OTHER TRANSACTION THROUGH MOBILE DEVICE USING NFC TO ACCESS A CONTACTLESS TRANSACTION CARD

BACKGROUND

Mobile commerce, using mobile devices such as smart phones, tablets or the like, is rapidly expanding in popularity. Many applications for such devices enable users to make "in app" purchases, that is to say, to purchase content, goods or services on-line from within the application running on the mobile devices. On-line purchases also may be made using a generic browser application as the interface and Internet communications. Many purchase transactions using mobile devices today require use of an existing credit or debit card account. More recently, several different companies have introduced mobile wallet type services that allow users to pay for goods and services at more traditional brick-and-mortar type establishments via their mobile devices. However, mobile wallet type services also require input of information to identify one or more of the user's credit or debit card accounts, to be used in actual transactions.

Hence, many existing mobile commerce implementations for on-line mobile commerce or for mobile wallet type transactions require mobile device users to manually enter credit card or account information. Once entered, the device can be used, for example, in a transaction to purchase a product or service. Entry of the information may be necessary for each transaction. Processes such as linking out to existing accounts or preloading and storage of the account information have also existed, but those processes require a user to have a dependency on other applications, payment wallets or for the user to preload their payment details. In many cases, even these other processes require at least an initial manual entry of the account information.

A number of newer mobile devices include near field communication (NFC) capability, and this capability has recently been used in purchasing goods or services at brick and mortar establishments that have contactless payment terminals. However, even NIT based payment has typically required a previous set-up of the payment methodology, e.g. including user input of the relevant credit or debit account information.

Other techniques used to simplify payment flow include Amazon One-Click, which allows a user to purchase an item with a linked payment system using a single click. The disadvantages of such a system include the prerequisite that users must setup their payment method ahead of time and a single click is still required.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein relate to mobile device interaction with a contactless transaction card and associated communications of the mobile device involving or information obtained from the contactless transaction card. Although many of the examples involve account information maintained on the contactless transaction card, the present concepts may apply to cards carrying other types of information and associated mobile device activities utilizing such other information. However, for ease of discussion, most of the examples below focus on card information identifying or otherwise relating to a financial account and transactions or other activities through a mobile device relative to the account and using such account related information.

Figure 1:
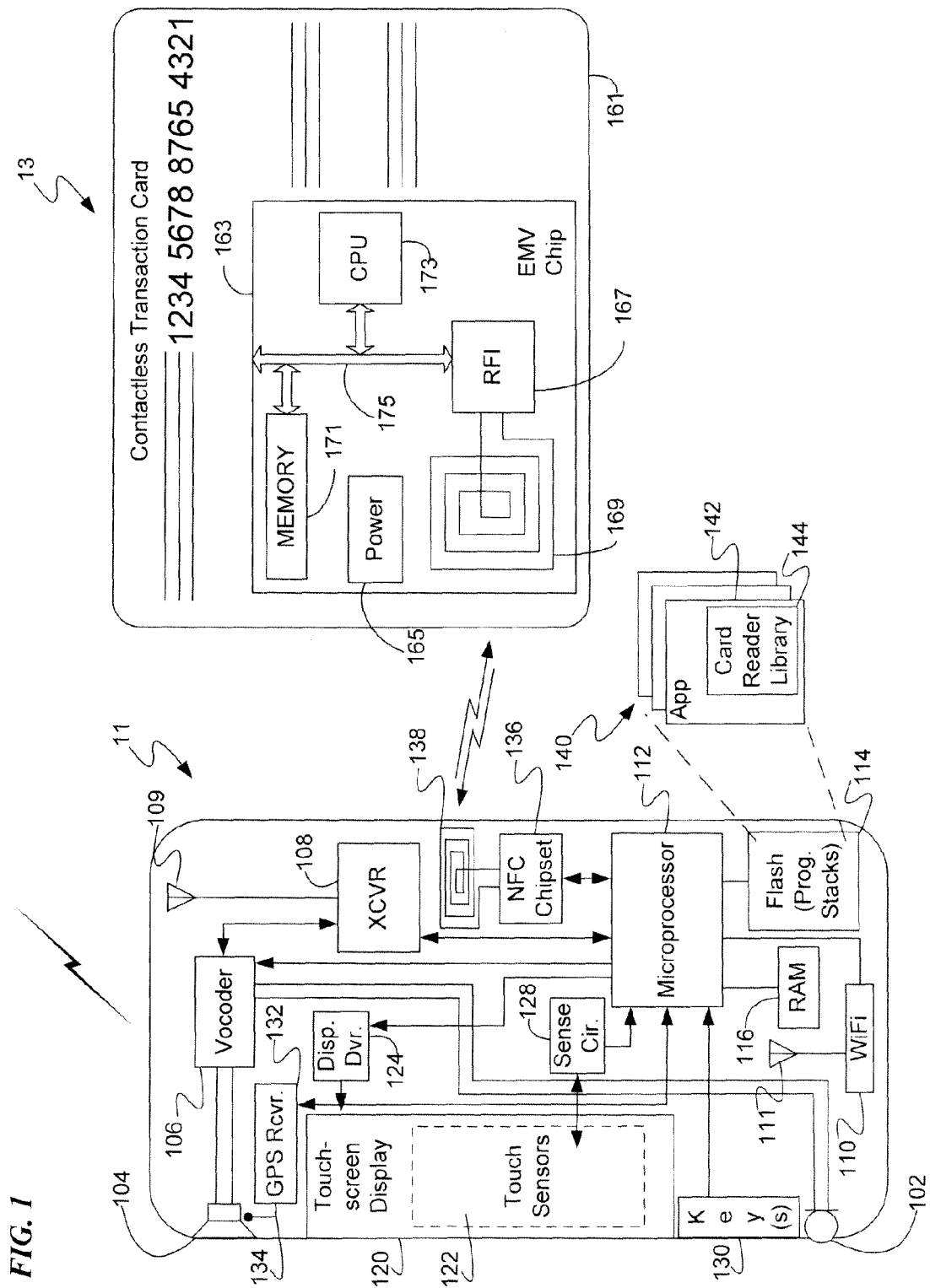
FIG. 1 is a high-level functional block diagram of an exemplary mobile device and contactless transaction card.

Reference now is made in detail to the examples illustrated in the accompanying drawings and discussed below. FIG. 1 illustrates a mobile device 11 and a contactless transaction card 13 and a relatively short range wireless communication between the mobile device 11 and a contactless transaction card 13. Many of the transactions implemented with respect to the account identified by information obtained from the card 13 relate to purchases using funds handled through the account. Hence, the card may at times be referred to as a payment card. However, the account information may be used to facilitate a variety of other types of financial transactions with respect to the identified account, such as automatic teller machine (ATM) transactions, on-line or in-hank account access, funds transfers, and the like. Hence, for discussion herein, the card 13 is more generally referred to as a contactless transaction card 13.

The example uses a Near Field Communication (NFC) sensor in the mobile device 11 to communicate with the contactless transaction card 13 for example, to make contactless transactions and retrieve account details from the card. In an exemplary process the following steps may take place. At a high level, the user brings the contactless transaction card 13 within proximity (e.g. 2-4 cm or less, although in some cases the distance may be up to 20 cm) of the NFC enabled mobile device 11 with the intent to conduct a transaction with a desired application on the mobile device 11. The application installed on the mobile device 11 will be listening for NFC events and will begin a contactless transaction flow by establishing communication with the contactless transaction card 13. Once account information and the like is obtained from the card 13, the application will use the retrieved information to complete a desired action based on the applicable business case. For example, the application may use the information from the contactless transaction card 13 for a purchase transaction on-line or at a brick-and-mortar establishment (e.g. via a point of sale or "POS" terminal or an automatic teller (ATM) machine). As another example, the application may use the information from the contactless transaction card 13 to populate text fields in an order form to complete a transaction or to match the user to an established account and save retrieved payment information for later use.

A process of this general type may be implemented via a variety of types of mobile devices having a processor, memory and NFC capability and a contactless transaction card, which often will also include a processor, memory and an RF (contactless) communication capability. It may be helpful to consider examples of a mobile device 11 and a contactless transaction card 13 in somewhat more detail.

FIG. 1 illustrates elements of the mobile device 11 and elements of the contactless transaction card 13 in functional block diagram form, at a relatively high level. First, we will consider the mobile device 11.

It should be appreciated that the disclosed subject matter may be implemented using any mobile computing device having NFC communication capability and mobile communication capability, configured to use those capabilities to conduct mobile transactions, e.g. for purchasing or the like, as discussed herein. In the example of FIG. 1, the mobile device 11 is in the form of a smart phone type mobile handset including a touch screen display. Examples of touch screen type mobile devices that may be used to implement mobile device 11 may include, but are not limited to, a smart phone, personal digital assistant (PDA), tablet computer or other portable device with NFC capability. However, the structure and operation of the touch screen type mobile device 11 is provided by way of example; and the subject technology as described herein is not intended to be limited thereto. For purposes of this discussion, FIG. 1 provides a block diagram illustration of the exemplary mobile device 11 having a touch screen display for displaying content and receiving user input as or as part of the user interface.

Although the transactions that are the focus of discussions here will utilize data communications, a typical mobile device such as the exemplary smart phone 11, will also support voice communications. Hence, in the example shown in FIG. 1, mobile device 11 includes a microphone 102 for audio signal input and a speaker 104 for audio signal output. The microphone 102 and speaker 104 are communicatively coupled to a voice or audio encoder/decoder (vocoder) 106. For a voice telephone call, for example, the vocoder 106 provides two-way conversion between analog audio signals representing speech or other audio and digital samples at a compressed bit rate compatible with the digital protocol of wireless telephone network communications or voice over packet (Internet Protocol) communications. The vocoder, speaker and microphone may also be used as elements of the user interface during other operations of the device, including some types of transaction communications.

Also, as shown in FIG. 1, the mobile device 11 includes at least one digital transceiver (XCVR) 108, for digital wireless communications via a wide area wireless mobile communication network, although the mobile device 11 may include additional digital or analog transceivers (not shown). The transceiver 108 conforms to one or more of the various digital wireless communication standards utilized by modern mobile networks. Examples of such transceivers include, but are not limited to transceivers configured to operate in accordance with Code Division Multiple Access (CDMA) and 3rd Generation Partnership Project (3GPP) network technologies including, for example and without limitation, 3GPP type 2 (or 3GPP2) and 3GPP Long Term Evolution (LTE), at times referred to as "4G." In an example, transceiver 108 provides two-way wireless communication of information including, digitized audio signals, still image and/or video signals, web page information for display as well as web related inputs, and various types of mobile message communications to/from the device.

Several of these types of communications through the transceiver and a network, as discussed later, will relate to user financial transactions on or involving a credit or debit account of the device user. On-line transaction related communications involving information obtained from the contactless transaction card 13, for example, will often utilize Internet Protocol (IP) packet data transport utilizing the digital wireless transceiver (XCVR) 108 and over the air communications to and from base stations of the serving mobile network. Such communications may include specific account related data as may include related text, image, video and/or audio information for output to or input from the user during a particular transaction. However, such wireless transaction data communications will include at least some of the account information obtained from the contactless transaction card.

Transceiver 108 also sends and receives a variety of signaling messages in support of various voice and data services provided by a network of a wireless service provider, to a user of mobile device 11 via the mobile communication network. Transceiver 108 connects through radio frequency (RF) send-and-receive amplifiers (not separately shown) to an antenna 109. Transceiver 108 may also support various types of mobile messaging services, such as short message service (SMS), enhanced messaging service (EMS) and/or multimedia messaging service (MMS). Although transaction communications involving account data obtained from the contactless transaction card 13 typically utilize IP data transport, such transaction communications may at times utilize one or more of these mobile messaging services for the data transport through the mobile communication network.

Many modern mobile devices also support wireless local area network communications over WiFi, instead of or in addition to data communications using the wide area mobile communication network. Hence, in the example of FIG. 1, for packet data communications, the exemplary device 11 also includes a WiFi transceiver 110 and associated antenna 111. Although WiFi is used here as the example, the transceiver 110 may take the form of any available two-way wireless local area network transceiver of a type that is compatible with one or more standard protocols of communication implemented in wireless local area networks, such as one of the WiFi standards under IEEE 802.11 and/or WiMAX. The transceiver 110, for example, may provide two-way data transport for wireless communication with a wireless access point in a residence or enterprise that the user frequents or with any available hotspot offered in a public venue. Although communicating through a different network or networks, the transceiver 110 supports various types of data communications similar to the packet data communications supported via the mobile network transceiver 108, including communications related to transactions involving data obtained from the contactless transaction card 13.

WiFi, as in the illustrated example, has been widely adopted for wireless local area network communications, e.g. currently over distances of up to about 100 meters or so. Although this range is somewhat shorter than that available from mobile networks via the transceiver 108, the wireless local area network communications typically incur no or lower data usage charges than the communications via the transceiver 108 using the mobile network.

Mobile device 11 further includes a microprocessor (or "processor") 112, which serves as a programmable controller for mobile device 11 by configuring mobile device 11 to perform various operations, for example, in accordance with instructions or programming executable by processor 112. Such operations may include, for example, various general operations of mobile device 11 as well as operations related to the communication with the contactless transaction card 13 and conducting related transactions as described herein. A flash memory 114 is used to store, for example, programming or instructions for execution by the processor 112. Depending on the type of device, the mobile device 11 will store and run an operating system through which specific applications may be run on the device. Examples of operating systems include Android, Apple iOS (I-Phone or iPad devices), Windows Mobile, RIM BlackBerry operating system, or the like. Flash memory 114 may also be used to store mobile configuration settings for different mobile applications or services executable at mobile device 11 (using processor 112). Mobile device 11 may also include a non-volatile random access memory (RAM) 116 for a working data processing memory.

Of course, other storage devices or configurations may be added to or substituted for those in the example. Such other storage devices may be implemented using any type of storage medium having computer or processor readable instructions or programming stored therein and may include, for example, any or all of the tangible memory of the computers, processors or the like, or associated modules. The instructions or programming may be used to embody aspects of the interaction with the card 13 and related transactions, as described herein. Program aspects of the technology may be thought of as "products" or "articles of manufacture" typically in the form of executable code or process instructions and/or associated data that is stored on or embodied in a type of machine or processor readable medium.

A mobile device supporting card reading and related transaction communications of the type under consideration here may include a variety of different types of user interface elements. For discussion purposes, in the smart phone example shown in FIG. 1, the user interface elements of mobile device 11 include a touch screen display 120 (also referred to herein as "touch screen 120" or "display 120"). For output purposes, the touch screen 120 will include a display screen, such as a liquid crystal display (LCD) or the like. For input purposes, touch screen display 120 includes a plurality of touch sensors 122. Other interface elements may include a keypad including one or more keys 130. For example, the keypad may be implemented in hardware as a T9 or QWERTY keyboard of mobile device 11 and keys 130 may correspond to the physical keys of such a keyboard. Alternatively, keys 130 (and keyboard) of mobile device 11 may be implemented as "soft keys" of a virtual keyboard graphically represented in an appropriate arrangement via touch screen display 120. The soft keys presented on the touch screen display 120 may allow the user of mobile device 11 to invoke the same user interface functions as with the physical hardware keys. In some implementations, the microphone 102 and speaker 104 may be used as additional user interface elements, for audio input and output, including with respect to some functions related to the transaction processing and communication, as described herein.

For output, touch screen display 120 is used to present information (e.g., text, video, graphics or other visible content) to the user of mobile device 11. Processor 112 controls visible display output on the LCD or other display element of the touch screen display 120 via a display driver 124, to present the various visible outputs to the device user. For example, some of the transaction related programming may cause the processor 112 to operate the driver 124 to cause screen 120 to display visible multimedia information about a product or service that the user may desire to purchase via a payment transaction using account information obtained from the contactless transaction card 13.

In general, touch screen display 120 and touch sensors 122 (and one or more keys 130, if included) are used to provide the textual and graphical user interface for the mobile device 11. In an example, touch screen display 120 provides viewable content to the user at mobile device 11. Touch screen display 120 also enables the user to interact directly with the viewable content provided in the content display area, typically by touching the surface of the screen with a finger or an implement such as a stylus.

In some implementations, touch screen display 120 is a capacitive touch screen display and touch sensors 122 are independent capacitors arranged as a grid and disposed at various points throughout a transparent conductive material (e.g., indium tin oxide) that is layered onto a hard surface composed of insulating material (e.g., glass). As another example, the respective locations of touch sensors 122 (e.g., capacitors) may correspond to different intersection points of a matrix of rows and columns of the layered conductive material. Alternatively, touch sensors 122 may include a grid of capacitive electrodes formed of one or more layers of transparent conductive material etched onto a sheet of hard insulating material, as described above. However, it should be noted that touch screen display 120 is not limited to either of the above-described implementations. Accordingly, touch screen display 120 may be implemented using any of various conventional or other techniques based on, for example, the type of capacitive touch screen technology desired for a particular implementation. User input includes touch of the display device with the user's finger, stylus or similar type of peripheral device used for user input with a touch screen. When current is applied to touch screen display 120, user input can be detected by touch sensors 122 based on a measurable change (e.g., reduction) in mutual capacitance based on measurable changes in capacitance and voltage at one or more individual sensor locations corresponding to the physical point(s) of contact of the user's finger(s) or conductive stylus with respect to touch screen display 120.

As shown in FIG. 1, mobile device 11 also includes a sense circuit 128 coupled to touch sensors 122 for detecting the occurrence and relative location/position of each touch with respect to a content display area of touch screen display 120. In this example, sense circuit 128 is configured to provide processor 112 with touch-position information based on user input received via touch sensors 122. In some implementations, processor 112 is configured to correlate the touch position information to specific content being displayed within the content display area on touch screen display 120. The touch-position information captured by sense circuit 128 and provided to processor 112 may include, but is not limited to, coordinates identifying the location of each detected touch with respect to the display area of touch screen display 120 and a timestamp corresponding to each detected touch position.

The information provided by sense circuit 128 may include, for example, a series of different locations of touch points/positions detected across the content display area of touch screen display 120 over a predetermined period of time. The location and time information for a series of continuous touch points/positions can be used by processor 112 to track the movement of the user's finger(s) (or other input device) across touch screen display 120. This information also may be used to track various parameters including, but not limited to, the direction and speed of finger movement based on changes between the different touch positions over time. The information tracked by sense circuit 128 is used by processor 112 to detect various points of touching as well as different types of touch gestures, for enabling the processor and thus the device 11 to perform operations in accordance with each touch or touch gesture, including any related to transactions or the like with respect to the contactless transaction card 13 and/or the account identified by the information obtained from the card 13.

The user interface capabilities of the mobile device 11 provide output to and receive input from the user of the device 11, for any of the various functions, operations or applications of the device. For example, programming discussed more later that configures the mobile device 11 to obtain and act on information from the contactless transaction card 13 causes the mobile device to provide information about or in relation to the action performed using the card information, for a user of the mobile device, and/or to receive input from the user regarding the action using the card information, via the element(s) of the user interface. For example, the device 11 may present account information read from the card 13 on the display 120 during a transaction on the account.

Many implementations of mobile devices today support location based services, which are quite popular now, particularly with smart phone and tablet users. Location information today may be used in a variety of services/applications. Of note for purposes of this discussion, some uses or transactions involving account or other information obtained from the contactless transaction card 13 may also involve location determination and/or associated tracking. By way of just one example, at this point in our discussion, the current location of the device 13 may be recorded in memory of the device and/or communicated to a server or other equipment involved in a transaction, when the mobile device communicates over a network (e.g. to conduct a transaction) using the information obtained from the contactless transaction card 13.

There are a variety of ways that a mobile device may be configured to obtain information as to current location of the device. In our example, the mobile device 13 includes a global positioning satellite (GPS) receiver 132 and associated antenna 134. GPS is a space-based satellite navigation system that provides location and time information anywhere on Earth, where there is an unobstructed line of sight to at least three, or four or more of the GPS satellites.

Under control of the microprocessor 112, the GPS receiver 132 receives and processes signals from one or more satellites of the constellation of GPS satellites. From its processing, the GPS receiver 132 supplies GPS data to the microprocessor 112. In some configurations, the GPS receiver determines the actual position fix and supplies data such as latitude and longitude to the microprocessor. In other implementations, the GPS receiver 132 takes pseudorange measurements from received satellite signals and supplies the measurements and associated PN codes for measured satellite signals to the microprocessor 112 for use in determining the position fix. Hence, associated computations to make an actual location determination may be performed in the microprocessor 112 or by a processor or the like included in the GPS receiver 132.

In this way, the GPS receiver 132 receives and processes signals from three or more of the GPS satellites to enable the microprocessor 112 to determine the location of the mobile device 11 in real time as the customer travels about. The device may implement location determination in a standalone mode or a network assisted mode. Standalone GPS operation uses radio signals from satellites alone. On the other hand, Assisted GPS (A-GPS) additionally uses network resources to 'assist' in the determination of device location, for example, in poor satellite signal conditions (e.g., in a city or building). The GPS receiver alone, or in combination (aGPS) with other network elements can enable the device 11 to determine the latitude and longitude of the mobile device, which the device or a server in communication with the device can use in a variety of ways, e.g. to map current location and/or provide navigation directions to another location. The location capability of the device 11 provided by the GPS receiver and associated processing allows a determination of location in relation to transaction communications or the like, e.g. to add location data such as latitude and longitude or a street address or establishment identifier obtained from latitude and longitude to stored in the device or a server in combination with transaction records so a to track device location during operations relevant to the account identified from information obtained from the contactless transaction card 13.

The mobile device 11 also has NFC communication capability. NFC may be used for a variety of different functions or applications of the mobile device 11. However, for purposes of this discussion, the mobile device 11 interacts with the contactless transaction card 13 via the NFC communication capability of the device 11. As discussed later, some actions utilizing the account information may also involve NFC communications of the mobile device 11 with other NFC capable devices, such as at a terminal at a point of sale (POS) or an automatic teller machine (ATM).

NFC is a set of standards for smart phones and similar devices, such as the exemplary mobile station 11 discussed here, to establish radio communication with other such devices as well as with compatible NFC readers by coming to close proximity (e.g., 4-10 cm or less). Due to its short range and support for encryption, NFC communication is suitable for secure communication over short distances. Each NFC enabled mobile station or NFC reader includes a transceiver configured to communicate with other NFC capable equipment.

Hence, the exemplary mobile station 11 further includes a near field communication (NFC) sensor. The NFC sensor may be implemented in a variety of ways. In the exemplary mobile device 11 of FIG. 1, the NFC sensor includes an NFC type radio frequency transceiver, which in the example is formed by an NFC chipset 136. The NFC chipset 136 provides two-way wireless communication of information in accordance with NFC technology and protocols. The exemplary NFC sensor also includes an antenna, such as coil antenna 138; and the NFC chipset 136 of device 11 connects to the NFC coil antenna 138, for transmitting and receiving NFC communications to/from other NFC compatible devices with compatible transceivers over short air link distances. The transceiver formed by the NFC chipset 138 also sends and receives a variety of signaling messages for establishing NFC links with other NFC-enabled devices and sends and receives various user data over the established NFC links. The signaling, for example, may allow the transceiver formed by the NFC chipset 138 to detect proximity of another NFC capable device, establish an NFC link with the other device, trigger execution of an appropriate application within the mobile device 11 and send and/or receive data for the application as between the mobile device 11 and the other NFC capable device. Some modern mobile stations are already coming equipped with such NFC equipment, and increased NFC deployment is expected in the near future.

The logic implemented by the processor of the mobile device 13, in the example, by the microprocessor 112, configures the processor to control various functions as implemented by the mobile device 13. The logic for a processor may be implemented in a variety of ways, but in our example, the processor logic is implemented by programming for execution by the microprocessor 112. The programming may take a variety of forms; and depending on the general program architecture, aspects relating to communication with the contactless transaction card 13 and transactions and the like utilizing information obtained from the card 13 may be implemented in various ways. For example, the card reading, account processing and related transaction functions could be implemented using a special module in the operating system and/or as a standalone application program. In our example, the programming for the card reader functions are implemented using a programming library, which may be embedded within any device application program intended to utilize the account information for account related actions. The actions of the mobile device 11 utilizing the information obtained from the card 13 a controlled by processor execution of the respective application program.

Hence, the example includes a number of application programs 140 stored in the flash memory 114 for execution by the microprocessor 112. Any application 142 that is intended to utilize account related information obtained from the contactless transaction card 13 includes a copy or instance of a card reader library 144. Execution of the library 144 by the microprocessor 112 enables the mobile device 11 to read account data or the like from the card 13 using the NFC sensor formed by the NFC chipset 136 and the associated antenna 138. Specific actions implemented using the account information, such as purchase or ATM transactions, can be implemented by execution of the other programming of the respective application 142.

For example, execution of the library 144 by the microprocessor 112 enables the mobile device 11 to detect via the near field communication sensor formed by chipset 136 and antenna 138 when a contactless transaction card 13 is within suitable proximity (e.g. within NFC communication range) and to communicate with the contactless transaction card 10 via the near field communication sensor. The library and/or associated application programming configures the microprocessor 114 to enable the mobile device 11 to automatically obtain account information from the contactless transaction card 13 and to utilize the account information from contactless transaction card 13 to perform an action in relation to a financial account identified by the account information.

The structure and operation of the mobile device 11, as outlined above, were described to by way of example, only.

The contactless transaction card 13 in our example includes a standard card stock 161 and one or more semiconductor chips embedded on or within the card stock 161. For financial account cards, at least, the card stock 161 typically will include on its front and/or back surfaces various numbers, text and other indicia and be sized and proportioned, in such a manner that the card 13 appears the same as or similar to an otherwise regular debit or credit card or the like. The embedded chip or chips configure the contactless transaction card 13 to use short range radio frequency waves (RF) for secure data communication. Although the contactless transaction card could use any other smart card type of chip implementation, in our example, the contactless transaction card 13 implements a global standard for secure communication with payment terminals or the like, in the example, of the type referred to as EMV (Europay, MasterCard, and Visa) based on ISO/IEC 14443.

Hence, the exemplary card 13 includes an embedded EMV chip 163. For illustration and discussion purposes only, the chip 163 is shown in an extremely enlarged form and a selected few of the elements of such a chip are shown in functional block diagram form. At the high-level illustrated in the drawing, the EMV chip 163 includes a power supply module 165, a radio frequency (RF) interface (RFI) transceiver 167 and associated coil antenna 169, one or more memories 171, a processor serving as the central processing unit (CPU) 173 of the chip 163 and a bus system 175.

The contactless transaction card 13 does not include a battery or other internal power source. Instead, the power module 165 collects energy at the time of a communication from the RF transmissions from the terminal device or the like attempting communication with the contactless transaction card 13. Power may be obtained via the coil antenna 169 or another inductive coil (not separately shown) in or connected to the chip 163. The power module 165 converts the collected energy to one or more appropriate direct current (DC) voltage levels and distributes the resulting DC power to the other elements on the chip 163, as needed.

The exemplary RFI transceiver 167 connects to the coil antenna 169, for transmitting and receiving EMV compliant RF communications to/from EMV enabled terminal devices with compatible transceivers over short air link distances. The EMV communications use a frequency band that is within the frequency range used for NFC communications by NFC transceivers such as the transceiver formed by the chipset 136 in mobile device 11. Also, the communication protocol of the RFI 167 in the EMV chip 163 is a subset of the NFC protocol used by NFC transceivers such as the transceiver formed by the chipset 136. Hence, the chipset 136 and RFI transceiver 167 are sufficiently compatible to enable the mobile device 11 to detect and communicate with a contactless transaction card 13, in a manner analogous to communications with other NFC capable devices. From the perspective of the card, for example, the NFC enabled mobile device 11 can appear similar to an EMV capable card reader terminal.

The memory 171 stores data and executable programming for the CPU 173. When the card 13 is configured for use as a financial account card, such as a credit card, a debit card, an ATM card or the like, the data in the memory, for example, may include various account information, such as account number, user identification, a personal identification number (PIN) or the like for user verification and possibly account balance and/or transaction record information. Some or all of the information may be read from the contactless transaction card 13, by regular EMV compliant card reader equipment or via the mobile device 11.

The bus 175 supports signaling and transfer of data and/or instructions as between various elements on the chip 163 including the CPU 173, the memory 171 and the RFI transceiver 167. The memory 171 and programming execution by the CPU 173 provide a secure data storage.

Although cryptographic elements are not separately shown, the EMV chip 163 also is configured such that the account related transmissions via the RFI transceiver 167 are encrypted. Communications to the card 13 via the RFI transceiver 167 also may be encrypted, for decoding by element(s) on the chip 163.

The secure data storage and encrypted communication provide enhanced security and reduce the likelihood of fraud against the card user's financial account.

Contactless transaction cards, like the card 13, can be used in a variety of transactions/applications. Typical examples of actions using such a card in relation to a financial account involve RF communications with point of sale terminals and/ or ATMs. Such card, however, may have other uses, such as user identification for access control or electronic passports, user document validation, or the like. By enabling the mobile device 11 to read data from the card 13 in a secure manner, the uses of the card and the information read/obtained from the card can be extended to the user's mobile device 11. As outlined above, using the NFC technology of the mobile device 11, one or more applications 142 on the device 11 can detect and interact with a contactless transaction card, such as card 13 to obtain information from the card and can then use that information in a subsequent action.

The structure and operation of contactless transaction card 13, as outlined above, were described to by way of example, only.

Figure 2:
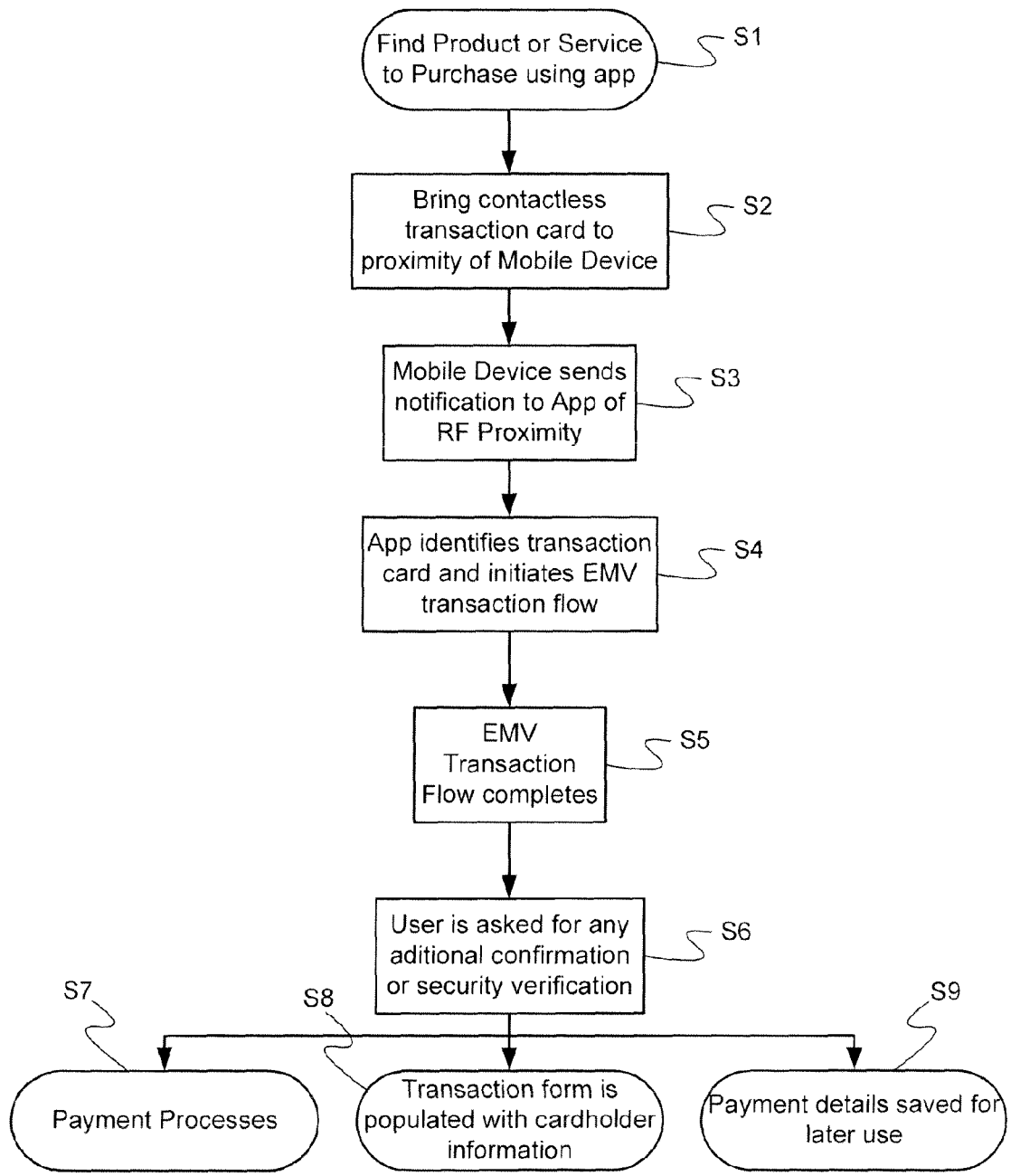
FIG. 2 is a flow chart useful in understanding interaction between the mobile device and contactless transaction card, for example, in support of various possible uses of account or other information from the card via the mobile device.

Hence, at a high level, the mobile device 11 shown in FIG. 1 utilizes an embedded near field communication (NFC) capability to interact with a contactless transaction card 13, to automatically obtain account information or other information from the card 13. The mobile device 11 may then use the information to perform any one or more of a variety of actions. Where the card 13 is tied to a financial account, the actions may include various on-line and terminal interaction activities, including virtually essentially any or all of the various types of transactions that a user may want to perform in relation to the account. FIG. 2 is a simplified flow chart showing steps of a process as may be implemented by the mobile device 11, for example, in support of various possible uses of account or other information from the card via the mobile device 11.

A relevant mobile application 142 is installed on the NFC enabled mobile device 11 and is registered to respond to NFC events or handle RF interactions. The application 142 may be pre-installed by the manufacturer or the network service provider/carrier before sale of the device 11 to the user. Alternatively, the application 142 may be downloaded over-the-air to the mobile device 11 using one of the wireless transceivers 108 or 110, for example, from an on-line application or media store.

For discussion of the process flow of FIG. 2, we will assume that an appropriate application is installed and registered within the mobile device 11. Also, in this example, the process to communicate and retrieve account information via the mobile device relates to an action to be implemented through the application, e.g. when the user operates the application on the device 11 to find a product or service to purchase using the application (step S1). At step S2, the user brings the contactless payment card 13 within proximity of the mobile device 11 and thus within proximity of NFC sensor, in our example formed by the transceiver/chipset 136 and antenna 138. In our NFC to EMV communication example, the mobile device 11 acts as an initiator and generates the RF field to power the passive target, in this case the EMV chip 163 on the contactless transaction card 13. RF power is received through magnetic induction through the antenna 169 and converted to power the chip 163 by the power module 165. Upon chip power-up in this manner, the NFC sensor in the mobile device 11 detects signals from the card 13 and effectively notifies the listening application 142 running on the microprocessor 112 that an RF based device with a similar technology is in communication range (step S3). The NFC transceiver formed by the chipset 136 receives a message from the RFI interface 167 in the EMV chip 163 on the card 13, in the form of an NDEF (NFC Data Exchange Format) Message. The NFC chipset 136 sends the details of the message to the microprocessor 112 for processing thereof via the executing application 142. The application 142 determines the type of technology being utilized to transmit the RF message based on the protocol and encoding of the message sent along with any additional NDEF data which the card 13 may have sent. When the application 142 identifies an NFC enabled other device as a contactless transaction card 13, it sends a connection request to the card to signify that it wants to begin data communication to initiate an EMV transaction flow (see step S4).

Although not shown as separate steps, upon successful initiation of the connection, the mobile device 11 and contactless transaction card 13 perform a number of steps to securely transfer account related information from storage in the memory 171 of the card 13 to the mobile device 11. The steps of the EMV transaction flow are as specified in the official EMV Standards Documents.

For example, a typical EMV Transaction flow may involve an Application selection step, which allows the mobile device 11 to query the EMV chip 163 in the card 13 to determine a list of supported applications on the mobile device 11. The mobile device 11 uses the list to determine the application 142 that is responsible for EMV payment transactions and select it to be run. The EMV Transaction flow next initiates application processing. The mobile device application 142 sends a processing options data objects list, which provides any necessary data the card 13 may require for transaction processing. The contactless transaction card 13 will respond with an application interchange profile (AIP), which details the list of functions to be performed during a transaction flow. The card 13 will also send an application file locator (AFL), which details a list of files and relevant data a terminal may need to read.

The transaction flow then involves a step for reading application data. In this step, the mobile application 142 uses the retrieved AFL to read all the records stored on the memory 171 of the EMV chip 163 on the contactless transaction card 13. The records read from the memory 171 and thus obtained by the mobile device 11, for example, may contain information such as primary account number, expiration date, cardholder name, and any relevant issuer or cardholder information. During a processing restrictions step, the records retrieved from the card 13 are validated against a set of rules to determine if the card is valid and can be used. Depending on the card issuer and the EMV application on the contactless transaction card 13, cryptographic information is then checked and security information such as Cardholder Verification Method (CVM) is determined. After the EMV transaction flow and associated communications are completed (S5), the application 142 closes the communication channel to the contactless transaction card 13.

In case of an error during the EMV communication, one or more reattempts can be made. If unsuccessful, after closing communication, the mobile device 11 will prompt the user via an output element of the user interface to restart the procedure or manually enter missing information if enough information is not available to proceed with the desired account transaction. Before completing the transaction a user may be prompted for additional CVM or confirmation, such as a PIN or entering billing zip based on issuer policies. These or other procedures for asking for and receiving addition user input are represented collectively by step S6 in the flow chart of FIG. 2.

Once payment details and credit card details are received, the application 142 will use the retrieved details to complete an action in or through operation of the mobile device 11, in relation to a financial account identified by the account information. As noted earlier, the application 142 may support any one or more of a variety of types of account related actions through the mobile device 11. Several examples appear in the flow diagram. At step S7, the mobile device 11 enables the user to complete a purchase transaction as started by the user in step S1 in our example, by using a contactless payment flow with or without user confirmation using EMV flow or using cardholder details to complete the purchase transaction using an online payment process. Another action might involve retrieving payment details obtained from the card and using that account information to populate text fields in an order form, to complete an online transaction, as shown at step S8. In addition or instead of a payment transaction in relation to the current purchase flow, the mobile device may match the user to an established account and save retrieved account information for later use (step S9).

As discussed above relative to FIGS. 1 and 2, the mobile device 11 utilizes its embedded NFC capability to interact with a contactless transaction card 13 to automatically obtain account information, and then uses that information to perform an account related action. Various account related actions may be implemented on the device and/or via other systems or networks. Although the device 11 may operate via a wide range of available types of networks, it may be helpful to consider an example of some networking as well as some of the equipment that the device 11 may interact with through a network.

Figure 3:
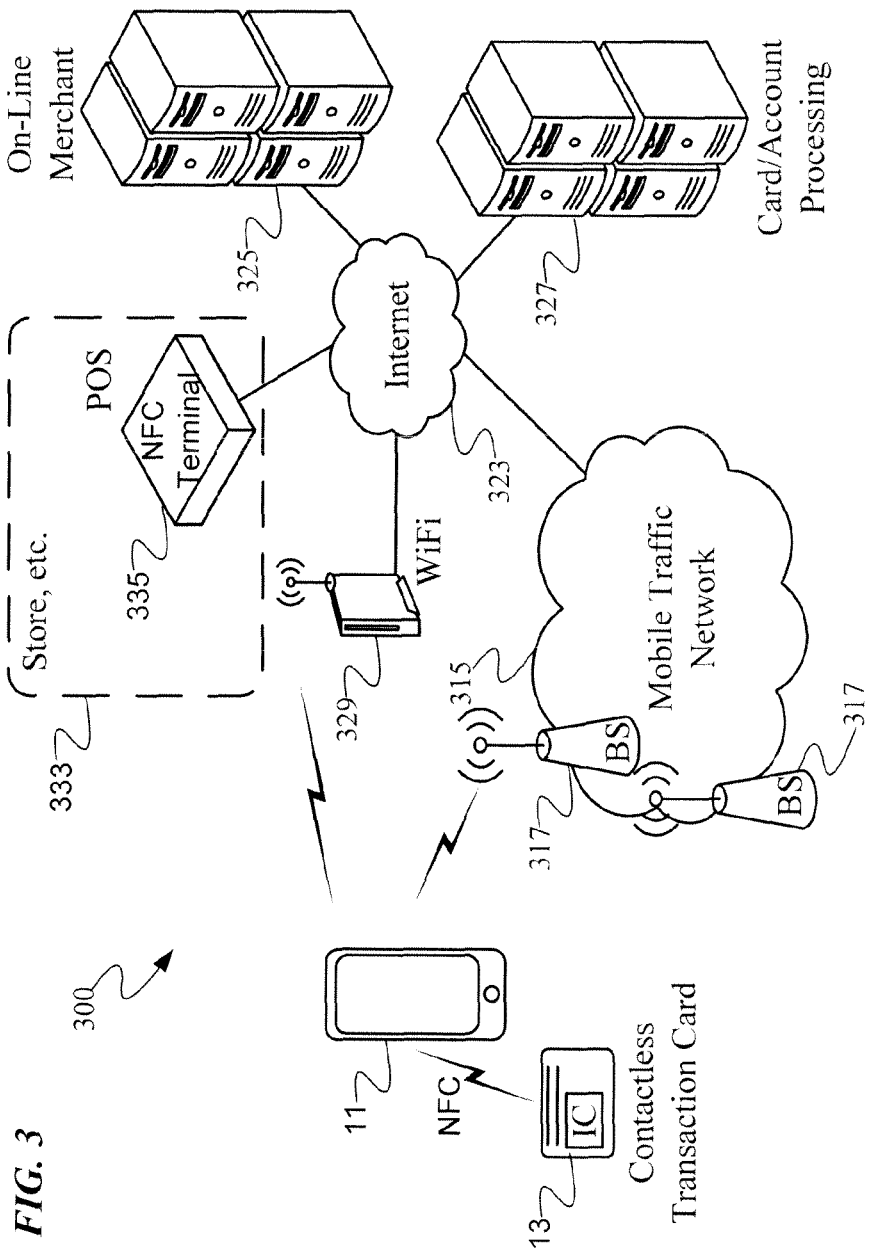
FIG. 3 is a high-level functional block diagram of an example of a system of networks/devices that provide various communications for mobile devices, for example, for a transaction or other communication that may utilize information that a mobile device obtains from a contactless transaction card.

FIG. 3 illustrates a system 300 offering a variety of mobile communication services, including communications for various financial account related actions by mobile device users. For purposes of the present discussion, a mobile transaction will be with respect to an account identified on by/associated with a contactless transaction card 13. The mobile device 11 obtains account related information from the card 13 via NFC communication, as discussed above. The mobile account related action, however, will involve additional communication with other equipment, which may utilize NFC, and/or mobile carrier provided network transport or wireless local area network transport and the Internet to communicate the accounted related information from the mobile device 11.

The example shows simply one mobile device 11 as well as a mobile communication network 315. The mobile device 11 is a smart phone type device, in this case that utilizes a touch screen for the user interface, including for any transaction related communications, of the type discussed above relative to FIG. 1. The network 315 provides mobile wireless communications services to mobile devices including device 11, for example, via a number of base stations (BSs) 317 of the network 315. The present techniques may be implemented in any of a variety of available mobile networks 315 and/or on any type of mobile device compatible with such a network 315 having the NFC capability under consideration here, and the drawing shows only a very simplified example of a few relevant elements of the network 315 for purposes of discussion here. Although only the one user's device 11 is shown, the network 315 will provide various communications for many other similar users and their various devices as well as for mobile devices/users that do not participate in the transaction communications under consideration here.

The wireless mobile communication network 315 may be implemented as a network conforming to any of the applicable standards for public mobile wireless communications, examples of which include, but are not limited to, Code Division Multiple Access (CDMA) and 3rd Generation Partnership Project (3GPP) network technologies including, for example and without limitation, 3GPP type 2 (or 3GPP2) and 3GPP Long Term Evolution (LTE), at times referred to as "4G."

Many of the mobile devices served by network 315, including device 11 in our example, are capable of voice telephone communications through the network 315, various types of mobile messaging service communication and mobile data communications. Although the messaging service transport could be used, the exemplary device 11 will typically utilize data communications through the particular type of network 315 for the communications related to the account corresponding to the information obtained from the contactless transaction card 13; and a user of such a device 11 typically will have subscribed to data service through the network 315.

In general, the network 315 offers users of the mobile devices such as device 11 (and other mobile devices not shown) IP data transport for a variety of data services, e.g. via the Internet 323, such as downloads, web browsing, email, etc. Such communications may be with other mobile devices, various other types of user terminals and/or computers configured as servers. For the account related communications, the drawing shows two examples of servers, connected in the example via the Internet 323.

The first server 325 is that of an on-line merchant. In a process example like that of FIG. 2 described above. Examples of on-line services that might utilize such a server 325 include on-line content stores, on-line catalog services, travel reservation services, etc. The mobile device 11 may communicate account related information obtained from the card 13 through the network 315 and the Internet 323 to the on-line merchant server 325 (FIG. 3). Additional communications are exchanged between the device 11 and the sever 325, for example, to complete a particular purchase transaction and/or to allow the server 325 to store financial account information for use in payments of future transactions between the user of device 11 and the merchant.

The other exemplary server is a card/account processing server 327. For example, if the server 325 is that of a credit card company or the like, the server 325 and/or the mobile device 11 may communicate with the server 327 to validate the identified account associated with the card and authorize payment for a particular purchase transaction against the account. Another example of an account server that might be implemented by a server 327 might offer on-line user access to bank or credit account information.

To insure that the merchant service offered by server 325 and/or the card or account processing service offered by server 327 is available on a virtually continuous uninterrupted basis for many similar users/devices, each server is typically implemented on many similar platforms on a distributed basis.

As noted in the discussion of the device 11 relative to FIG. 1 above, the device may be capable of WiFi communication as well as or instead of mobile wireless communication via a network like the illustrated carrier network 315. Hence, for discussion purposes, the drawing also shows a WiFi access point 329 connected to the Internet 323.

The WiFi access point 329 may be a hotspot in a public or commercial venue, which provides Internet access within the vicinity; or the WiFi access point 329 may be secured to provide private access in a home, an office, on a campus, or the like. The access point 329 provides WiFi enabled devices like mobile device 11 with wireless IP packet data communication, in this case, for access to the Internet 323. When available, accounted related communications with either of the servers 325 and 327 may utilize WiFi instead of wireless mobile communications through the network 315, for essentially the same types of account related actions.

In the examples discussed so far relative to FIG. 3, the mobile device activities utilizing the information obtained from the contactless transaction card 13 have involved network communications of the mobile device 11 with appropriate server computers, such as 325 and/or 327. However, the information from the contactless transaction card 13 is useable via the mobile device 11 in other commercial contexts. In the example of FIG. 3, since the mobile device 11 is NFC enabled, the NFC capability can also be used for transactions or the like in physical enterprise establishments having NFC of EMV compatible reader or terminal equipment. To illustrate this point by way of a simple example, FIG. 3 shows a brick-and-mortar store or the like 333 having an NFC terminal at the point of sale (POS). The establishment with the point of sale terminal, for example, may be any commercial establishment offering goods or services for sale. The concept, however, is similarly applicable to other commercial establishments, such as government entities, or the like; that is to say, to any enterprise having a physical location for use of an appropriate terminal with which the enterprise intends to interact with its users or customers in a way that involves input of account information or other personal user information obtained from a contactless transaction card 13.

Assume for discussion purposes that the facility at 333 is a store of a commercial enterprise. A user browses through the store and identifies one or more goods sold in the store for purchase. At the point of sale, the selected item or items is/are processed in the normal manner. Systems of the store (not separately shown) determine the total amount of payment that the user owes in order to complete the transaction, in the usual manner for such establishments. If the user's financial account data has previously been read from the card 11 and stored in memory of the mobile device 11, in a manner as outlined above, the user merely brings the mobile device 11 within range of the NFC terminal 335 at the point of sale. The POS terminal 335 and the mobile device 11 establish communication, and the account information for the purchase transaction is transferred from the mobile device 11 to the POS terminal 335, e.g. using an EMV transaction flow similar to that between the mobile device 11 and the contactless transaction card 13. Depending on the account/security requirements, the user may need to input an associated PIN for additional verification. The POS terminal 335 uses the received account information to complete the purchase transaction in the normal manner, similar to a credit or debit card input. For example, if required, the POS terminal or other store system may communicate through the Internet 323 with a card/account processing server like 327 to validate the identified account associated with the card 13 and authorize payment for the particular purchase transaction in the store 333 against the identified financial account.

In the example, the account information from the card 11 had previously been read from the card and stored in memory of the mobile device 11. If not previously stored, the user can bring the contactless transaction card 13 within proximity of the mobile device 11 to allow the mobile device 11 to obtain the information from the card 13 around the time of purchase at the point of sale, e.g. around the time of determination of the total amount due by the store system(s) but before the desired payment input to the NFC terminal 335.

The specific example of the store 333 and POS terminal 335 assumed a purchase type transaction. In a store or the like, similar procedures can be used to credit the user's account for refunds. A similar NFC capability if implemented in an ATM of a bank or the like, for example, also allows the user of the mobile device 11 to enter account information from the contactless transaction card 11 for a deposit or cash withdrawal transaction.

As noted in the discussion of FIG. 1, the mobile device 11 has the capability to determine its location, and information about a determined location can in included in or otherwise used in any action involving information that the device 11 obtains from the card 13. Information obtained from determinations of the device location, for example, can be combined with other information that the mobile device 11 records about activities related to the account associated with the contactless transaction card. For example, the application 142 may configure the mobile station 11 to store records of transactions that utilize information from the contactless transaction card 11 in internal memory 114. In such a configuration, with associated location determination, each transaction record could include or link to information on location of the device 11 determined at or within some relatively short time period around the time of the transaction.

In the context of FIG. 3, location information may also be sent to one or more of any servers involved in a particular transaction. Returning to our on-line purchase example, when the device 11 communicates with the on-line merchant server 325, the mobile device 11 also determines its current location and communicates information as to that location through the mobile network 317 and the Internet 323 to the server 325. If the transaction involves processing via the card/account processing server 327, either the merchant server 325 or the mobile device 11 may include the location information in the communications with the server 327. In this way, the server 323 and/or the 327 can record the device location at or around the time of the transaction, for example, in or linked to other recorded information about the transaction, for tracking or other analysis.

Figure 4:
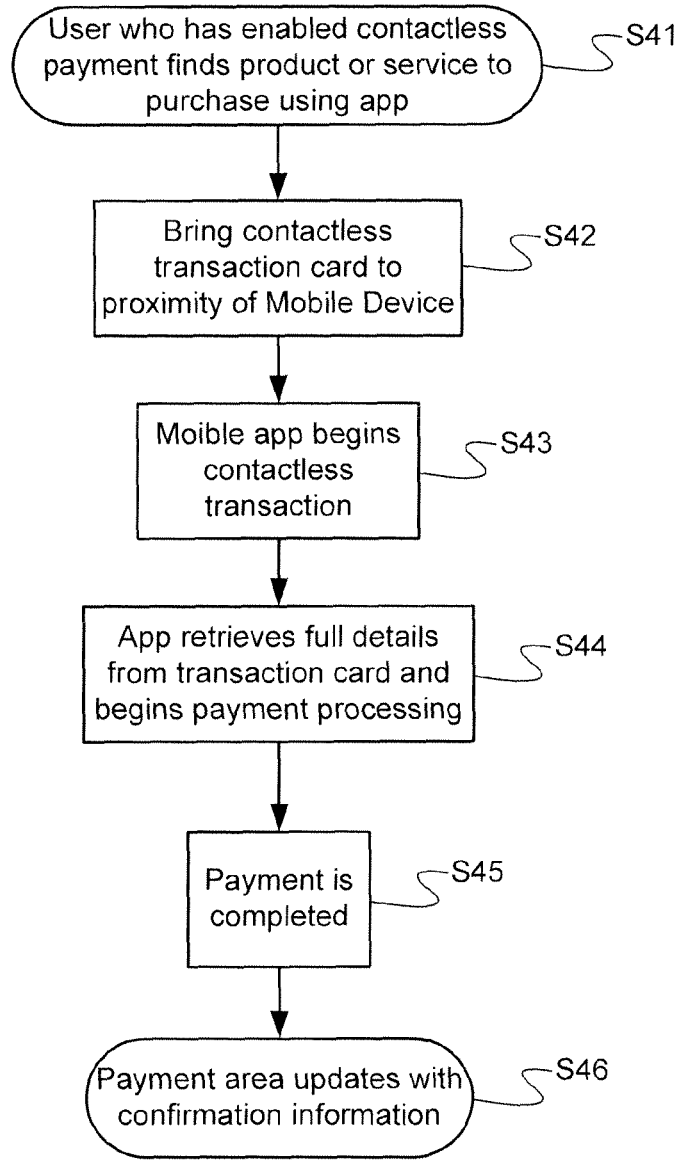
FIG. 4 is a flow chart useful in understanding a purchase transaction.

As shown by the discussion so far, many of the exemplary mobile device actions that may utilize information obtained from the contactless transaction card 13 relate to user purchases of goods or services. FIG. 4 is a flow chart of a high level process flow as may be used to implement a purchase transaction. In the example, the user who has enabled contactless payment on the mobile device 11 finds a product or service to purchase or a bill to pay using application 142 (step S41). For a purchase transaction, a user can simply select an item or service, and then bring their contactless transaction card 13 within range of the NFC sensor on device 11 to make a transaction (step S42). In our NFC to EMV communication example, the mobile device 11 acts as an initiator and generates the RF field to power the passive target, in this case the EMV chip 163 on the contactless transaction card 13. RF power is received through magnetic induction through the antenna 169 and converted to power the chip 163 by the power module 165. Upon chip power-up in this manner, the NFC sensor in the mobile device 11 detects signals from the card 13 and effectively notifies the listening application 142 running on the microprocessor 112 that an RF based device with a similar technology is in communication range. The desired application 142 installed on the mobile device 11 will be listening for NFC events and will begin a contactless payment transaction flow by establishing communication with the contactless payment card (step S43), in a manner similar to the earlier example of FIG. 2.

All details are then retrieved from the contactless transaction card 12 for the particular purchase transaction without user intervention, and the device 11 begins relevant payment processing (step S44). The procedure to obtain information from the card 13 may involve an EMV transaction flow the same as or similar to that outlined earlier in part of the discussion of FIG. 2. Once payment details and credit card details are received, the application 142 will use the obtained information to complete the transaction using contactless payment flow or if only partial details were retrieved from the contactless payment card a secondary order flow will complete, e.g. using credit card number, expiration date and CVM number. The payment transaction is completed at step S45. Via the device user interface, the displayed payment area on the application page will update with confirmation details, and a user will be able to navigate to other items via the application 142.

Although referred to generally as a card above, the contactless transaction card 13 may take many different forms that incorporate the EMV chip or similar integrated circuit device. For example, instead of a form factor that looks like a card, the card actually may be implemented in other form factors, such as a keytag, fob or the like.

In the process flow examples, for payment transactions for example, the use of an NFC enabled mobile device 11 allows the device user to "Tap to Pay" with a smart credit or debit card or keytag or fob that has EMV contactless transaction technology or the like. The user merely can bring the contactless transaction card (regardless of form factor) within range or tap it against against the mobile device 11, observe the card details output to the user via the display or other user interface output and confirm the output information by appropriate input to then pay or otherwise implement the desired transaction.

The technology also is useful for bill payment functions. For the mobile service provider, as an example, if the provider supplies an appropriate application 142, this solution can also be used to pay the network service bill associated with the device 11 using the account associated with the card 13. For this later type of transaction, the user may receive an alert message on the device 11 or operate the device to navigate to a pay bill page that prompts the user to wave/tap their card 13 to pay the latest bill. The user then waves their card 13 near the device 11 or taps the card 13 against the device 11, and the application 142 causes the mobile device 11 obtain information from the card 13 and to display the user's card details on the display screen 120 with a "confirm" button shown. In the touch screen type implementation of the mobile device 11, the user can touch the displayed button to "click" confirm, and the payment information is sent via a network to a server or the like of the service provider. The application 142 may also give the user an option to save the card details for future use.

For this type of usage, the network service provider's application is registered within the device 11 to receive notice of NFC events. When a contactless transaction card 13 is "tapped" to (comes within range of) the NFC sensor within the mobile device 11, the relevant application 142 receives notice of the event and deep links to a payment screen for the service provider account of the user. The application 142 sends a request to the contactless transaction card 13 for account information. An encoded message is sent from the card 13 to the device 11 and thus to the running application 142. The application decodes account details obtained from the card 13 and populates credit details into relevant payment fields for payment of the service bill. The information is displayed to the user; and when the user confirms, the application 141 proceeds with payment process, e.g. including communication through a network with the appropriate server of the service provider to send the account information to the server.

The automatic reading of account information from a contactless transaction card 13 may also be used with a mobile wallet type application. For such a usage, the user operates the mobile device 11 and manipulates the card 13 in essentially the same manner as outlined several times above. For this later usage example, however, a mobile wallet type application 142 receives the detail information from the card and keeps the information as a virtual credit card, debit card, ATM card or loyalty card in the mobile wallet implemented by the application. The mobile wallet application then allows the user to pay at store terminals using the account of card 13 using the information obtained from the card but stored in the application in the mobile device 11, via NFC communication or other appropriate inputs to the store system(s).

In the examples above, the card reader functionality is implemented in a mobile device 11 by processor execution of a library 144 embedded in an application 142 that is executable on the mobile device 11. The library would be essentially the same when embedded in different applications configured to implement different actions using information that the library enables the applications to obtain from contactless transaction cards like card 13. The application and library may be implemented in a variety of different ways. e.g. for mobile devices running different operating systems. To consider an example in somewhat more detail, we will assume that the mobile device 11 runs a version of the Android operating system.

In such an example, the NFC-EMV library 144 provides Android Libraries that allow for applications to detect, scan and read payment system information or the like contained on EMV Smart Cards or the like, such as the contactless transaction card 13 in our examples. The exemplary library is configured for integration within any compatible Android application.

To begin integration, the application developer can add the library package 144 to the relevant android application project and add an xml folder to the application resources directory (/res). In our example, the developer then registers the library by adding the following to the AndroidManifest.xml file outside of <application> tag:
   <uses-permission android:name="android.permission.NFC"/>

Also, in our example, added to the Activity that will be registered to NFC events is:

```
<intent-filter>
    <action android:name="android.nfc.action.TECH_DISCOVERED" />
</intent-filter>
<meta-data android:name="android.nfc.action.TECH_DISCOVERED"
android:resource="@xml/nfc_tech_list" />
```

From this registration and the provided NFC tech list an intention is declared to the Android Operating system of an interest in notifications when a compatible NFC technology or protocol is detected by the NFC sensor or sensors on the particular type of mobile device, for example, NFCa or NFCb over the IsoDep standard protocol. In such an example, all communication is performed over the 13.56 Mhz frequency band. When NFC compatible technology is detected, the library causes the device to immediately perform the desired functions before the card/chip link is lost (e.g. less than 3 seconds on a successful scan).

The following tables outline library functions that may be available upon execution of the exemplary Android library:

```
Class NfcCommunicator
    java.lang.Object
            com.vzw.hss.myverizon.nfc.NfcCommunicator
public class NfcCommunicator
extends java.lang.Object
Constructor Summary
Constructors
Constructor and Description
NfcCommunicator (Intent startingIntent)
```

-continued

```
Constructor takes in an intent and initializes the tag being communicated
with and other member values to null or empty strings.
Method Summary
Methods
Modifier and Type    Method and Description
JSONObject          getCardInfo( )
                    Begins communication with card, processes, and
                    returns processed info in a JSONObject.
java.lang.String    getMessage( )
                    Get the log that has been keeping track of certain
                    bits of information.
Methods inherited from class java.lang.Object
  equals, getClass, hashCode, notify, notifyAll, toString, wait, wait,
  wait
Constructor Detail
            NfcCommunicator
    public NfcCommunicator(Intent startingIntent)
    Constructor takes in an intent and initializes the tag being
    communicated with and other member values to null or empty strings.
    Parameters:
        startingIntent - <-the intent of the calling context will be passed.
    Method Detail
            getMessage
public java.lang.String getMessage( )
Get the log that has been keeping track of certain bits of information.
Returns:
    object message member
getCardInfo
    public JSONObject getCardInfo( )
    Begins communication with card, processes, and returns processed
    info in a JSONObject.
    Returns:
        JSONObject containing card info mapped to "Error_Code",
        "CNN", "Expiry_Date", "Expiry_Year", "Billing_Zip",
        "CVM"
    Throws:
        JSONException - if mapping card info to JSON Object fails.
        java.io.IOException - if error occurs during card to device
        communication.
```

As shown by the above discussion, functions relating to obtaining account related information from a contactless transaction card 13 and taking further action using that information in or from a mobile device 11 as shown in FIG. 1 may be implemented using executable programming on an appropriate mobile device and in at least some cases may involve communication with servers or the like connected for data communication via the components of a data network, such as the server 325 and/or the server 327 as shown in FIG. 3. In addition to the account related functions supported by the server(s) in the specific example of FIG. 3, the same or other server(s) may support downloading of original of upgrade versions of the relevant programming for the mobile device 11, through a network to install the programming in the device 11. Although special purpose devices may be used for any of these server functions, such servers also may be implemented using one or more hardware platforms intended to represent a general class of data processing device commonly used to run "server" programming so as to implement the respective functions discussed above, albeit with an appropriate network connection for data communication.

Figures 5, 6:
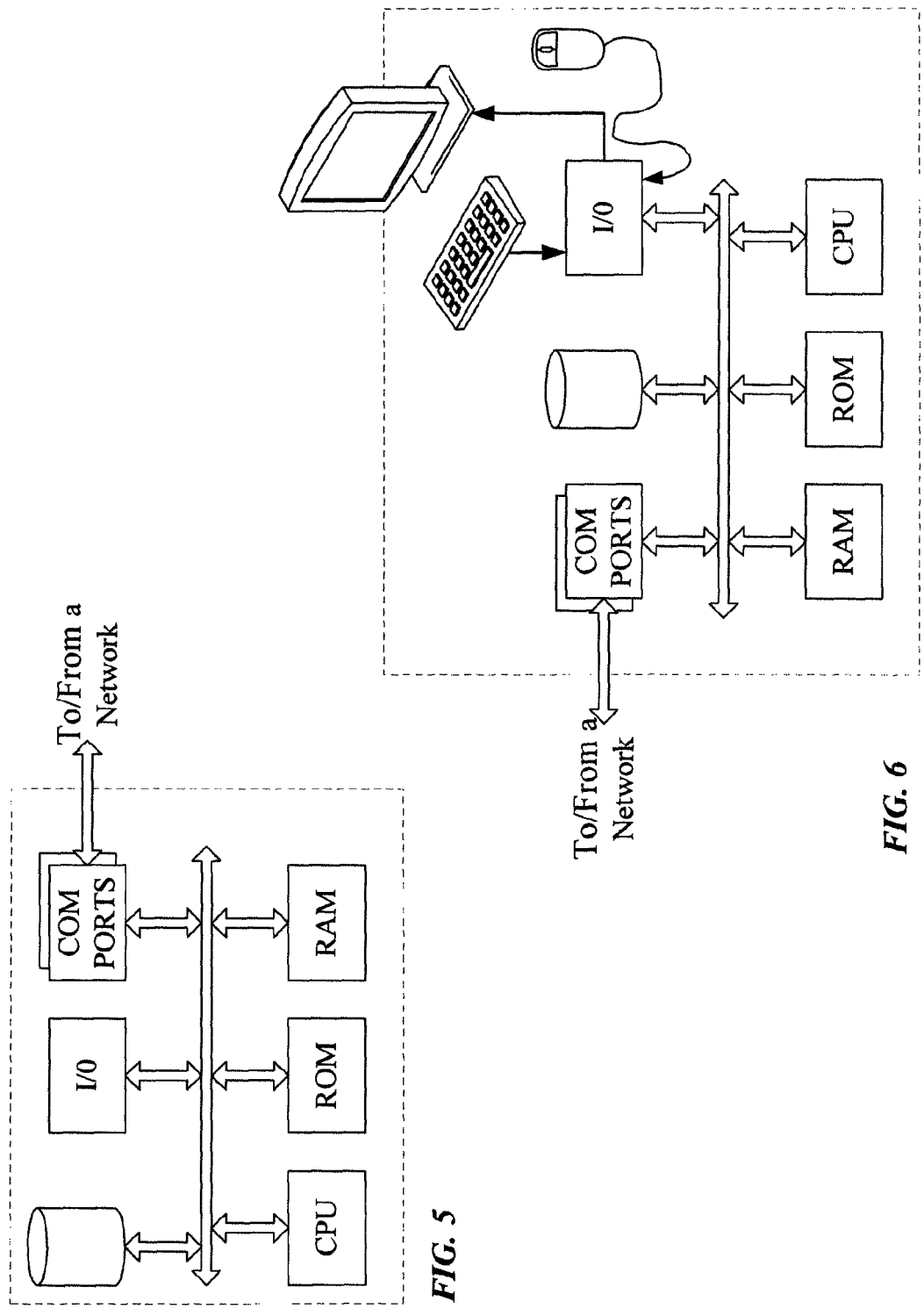
FIG. 5 is a simplified functional block diagram of a computer that may be configured as a host or server, for example, to function as the on-line merchant server or the card/account processing server in the system of FIG. 3.
FIG. 6 is a simplified functional block diagram of a personal computer or other work station or terminal device.

FIGS. 5 and 6 provide functional block diagram illustrations of general purpose computer hardware platforms. FIG. 5 illustrates a network or host computer platform, as may typically be used to implement a server. FIG. 6 depicts a computer with user interface elements, as may be used to implement a personal computer or other type of work station or terminal device, although the computer of FIG. 6 may also act as a server if appropriately programmed. It is believed that those skilled in the art are familiar with the structure, programming and general operation of such computer equipment and as a result the drawings should be self-explanatory.

The software functionalities involve programming, including executable code as well as associated stored data, e.g. executable code and associated data files used for the application 142. The software code is executable by the microprocessor 112 or other programmable processor of the mobile device 11, although as noted, at times, such software may be stored in another computer platform and downloaded through a network for installation in the mobile device 11. Execution of such code by a processor of the mobile device 11 enables the device 11 to implement the methodology for obtaining information from the card 13, conducting the associated action(s) and possibly providing relevant user input/output via the user interface of the device 11, in essentially the manner performed in the implementations discussed and illustrated herein.

Hence, aspects of the methods of card reading and related action processing outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of a merchant or an application store into the mobile terminal of the customer/user. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to read or otherwise obtain the information from a contactless transaction card and perform related actions using such information, as discussed above and shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A mobile device, comprising:
a wireless transceiver configured to enable wireless data communication via a network;
a near field communication transceiver;
a processor coupled to the wireless transceiver and the near field communication transceiver; and
programming stored in a memory accessible by the processor for execution by the processor, the programming comprising an application program including an embedded library, the embedded library configured to cause the mobile device to read information from a contactless transaction card via a Europay, MasterCard and Visa (EMV) communication protocol,
wherein execution of the programming configures the processor to cause the mobile device to perform functions, including functions to:
  detect, via the near field communication transceiver, proximity of the contactless transaction card;
  responsive to detecting the contactless transaction card, receive a data exchange message from the contactless transaction card;
  identify that the contactless transaction card is capable of secure communication, based on one or more characteristics of the received message including at least one of a protocol of the received message or an encoding of the received message;
  responsive to identifying that the contactless transaction card is capable of secure communication, perform the secure communication with the contactless transaction card using the EMV communication protocol stored in the embedded library via the near field communication transceiver, to automatically obtain the information from the contactless transaction card;
  compare the obtained information from the contactless transaction card with one or more predetermined rules to validate the contactless transaction card; and
  utilize the information obtained from the contactless transaction card to perform an action via the mobile device, when the contactless transaction card is validated,
wherein the application program is configured to cause the mobile device to perform the action by communication of at least some of the obtained information from the contactless transaction card via one of the wireless transceiver over the network and the near field communication transceiver in communication with another device using the EMV communication protocol stored in the embedded library.

2. The mobile device of claim 1, further comprising:
at least one user interface element coupled to the processor, wherein the processor is further configured to cause the mobile device to provide information about the action performed, including at least some of the information obtained from the contactless transaction card, for a user of the mobile device and/or to receive input from the user regarding the action, via the at least one user interface element.

3. The mobile device of claim 2, wherein
execution of the application program configures the processor to cause the mobile device to implement the communication with the contactless transaction card via the near field communication transceiver.

4. The mobile device of claim 2, wherein the processor is further configured to:
cause the mobile device, during the secure communication, to prompt the user of the mobile device for additional information via the at least one user interface element; and
complete the secure communication to obtain the information from the contactless transaction card responsive to the additional information input by the user via the at least one user interface element.

5. The mobile device of claim 2, wherein the processor is further configured to:
   detect an error during the secure communication with the contactless transaction card; and
   responsive to the detected error, cause the mobile device to prompt the user of the mobile device for additional information via the at least one user interface element, the additional information being used to complete the secure communication or to restart the secure communication.

6. The mobile device of claim 1, wherein the processor is further configured to:
   obtain information indicating a location of the mobile device at or around a time of the action; and
   use the information indicating the location of the mobile device in the performance of the action.

7. The mobile device of claim 6, further comprising:
   a global positioning satellite (GPS) receiver,
   wherein the processor is configured to obtain the information indicating the location of the mobile device based at least in part on processing of received GPS satellite signals by the GPS receiver.

8. The mobile device of claim 6,
   wherein the processor is further configured to store a record of the action, including the information indicating the location of the mobile device at or around the time of the action, in the memory.

9. The mobile device of claim 1, wherein the other device is a point of sale (POS) terminal configured to perform the secure communication via the EMV communication protocol.

10. An article of manufacture comprising:
    a non-transitory machine readable medium, and
    programming embodied in the medium, the programming comprising an application program including an embedded library, the embedded library configured to cause a mobile device to read information from a contactless transaction card via a Europay, MasterCard and Visa (EMV) communication protocol, wherein execution of the programming by a processor of the mobile device configures the mobile device to perform functions, including functions to:
    detect, via a near field communication transceiver of the mobile device, proximity of the contactless transaction card;
    responsive to detecting the contactless transaction card, receive a data exchange message from the contactless transaction card;
    identify that the contactless transaction card is capable of secure communication, based on one or more characteristics of the received message including at least one of a protocol of the received message or an encoding of the received message;
    responsive to identifying that the contactless transaction card is capable of secure communication, perform the secure communication with the contactless transaction card using the EMV communication protocol stored in the embedded library via the near field communication transceiver, to automatically obtain account information from the contactless transaction card;
    compare the obtained account information from the contactless transaction card with one or more predetermined rules to validate the contactless transaction card; and
    utilize the account information obtained from the contactless transaction card to perform an action via the mobile device, when the contactless transaction card is validated,
    wherein the application program is configured to cause the mobile device to perform the action by communication of at least some of the obtained information from the contactless transaction card via one of the wireless transceiver over the network and the near field communication transceiver in communication with another device using the EMV communication protocol stored in the embedded library.

11. The article of claim 10, wherein:
    execution of the application program configures the processor to cause the mobile device to implement the communication with the contactless transaction card via the near field communication transceiver.

12. The article of claim 11, wherein execution of the programming further configures the processor to cause the mobile device to determine a location of the mobile device at or around a time of the action and use the information indicating the location of the mobile device in the performance of the action.

13. The article of claim 10, wherein execution of the programming further configures the processor to cause the mobile device to provide information about the action performed via at least one user interface element of the mobile device, including at least some of the information obtained from the contactless transaction card.

14. A method comprising steps of:
    detecting via a near field communication sensor in a mobile device when a contactless transaction card comes within proximity of the near field communication sensor;
    responsive to the detecting of the contactless transaction card coming within proximity of the near field communication sensor, receiving, by an application program stored in a memory of the mobile device, a data exchange message from the contactless transaction card, the application program including an embedded library configured to cause the mobile device to read information from the contactless transaction card via a Europay, MasterCard and Visa (EMV) communication protocol;
    identifying, by the application program of the mobile device, that the contactless transaction card is capable of secure communication, based on one or more characteristics of the received message including at least one of a protocol of the received message or an encoding of the received message;
    responsive to identifying that the contactless transaction card is capable of secure communication, performing, by the application program of the mobile device, the secure communication with the contactless transaction card using the EMV communication protocol stored in the embedded library via a near field communication transceiver of the mobile device, to automatically obtain the information from the contactless transaction card by the mobile device;
    comparing, by the application program of the mobile device, the obtained information from the contactless transaction card with one or more predetermined rules to validate the contactless transaction card; and
    performing an action using the obtained information via the application program of the mobile device, when the contactless transaction card is validated,
    wherein the application program is configured to cause the mobile device to perform the action by communication of at least some of the obtained information from the contactless transaction card via one of the wireless transceiver over a network and the near field communication transceiver in communication with another device using the EMV communication protocol stored in the embedded library.

15. The method of claim 14, wherein:
the action is an on-line transaction on a financial account identified by the information obtained from the contactless transaction card, and
performing the action includes mobile device communication via the network of the at least some of the information obtained from the contactless transaction card to identify the financial account.

16. The method of claim 14, wherein:
the at least some of the information identifies a financial account associated with the contactless transaction card; and
the action implements a financial transaction at an enterprise establishment utilizing the identified financial account.

17. The method of claim 14, further comprising steps of:
determining a location of the mobile device at or around a time of the action; and
using information indicating the determined location in the performance of the action.

18. The method of claim 17, wherein the step of using the information indicating the determined location comprises including the information indicating the determined location in a record of the action stored in a memory of the mobile device.

19. The method of claim 17, wherein the step of using the information indicating the determined location comprises sending the information, indicating the determined location via the network to a server for use in tracking activities of the mobile device.

20. The method of claim 14, wherein the step of performing the secure communication with the contactless transaction card comprises:
sending, by the mobile device, a processing data objects list to the contactless transaction card, the processing data objects list including data for use by the contactless transaction card during the secure communication;
responsive to the processing data objects list, receiving, by the mobile device, an application interchange profile (AIP) and an application file locator (AFL) each associated with the EMV communication protocol, the AIP including a list of functions to be performed during the secure communication, the AFL including data for use by the mobile device during the secure communication; and
performing, by the mobile device, the EMV communication protocol based on the received AIP and the received AFL.

21. The method of claim 14, further comprising a step of:
providing information about the action performed via at least one user interface element of the mobile device, including at least some of the information obtained from the contactless transaction card.

* * * * *